Patented Feb. 25, 1947

2,416,461

UNITED STATES PATENT OFFICE 2,416,461

CATALYSTS FOR THE POLYMERIZATION OF BUTADIENE-1,3 HYDROCARBONS

William D. Stewart, Akron, Ohio, assignor to The B. F. Goodrich Company, New York, N. Y., a corporation of New York No Drawing. Application February 13, 1943, Serial No. 475,796. In Canada February 19, 1942

10 Claims. (Cl. 260—84.5)

This invention relates to the polymerization in aqueous emulsion of butadiene-1,3 hydrocarbons either alone or in admixture with each other or with other unsaturated organic compounds copolymerizable therewith in aqueous emulsion, and has as its principal object to provide new catalysts or accelerators for such polymerizations by the use of which improved polymers may be obtained in increased yield and in a very short interval of time. This application is a continuation-in-part of my copending application Serial No. 379,712 filed February 19, 1941.

It has already been proposed in U. S. Patent 1,935,733 to Tschunkur and Bock to polymerize butadiene-1,3 hydrocarbons in presence of an oxidizing agent and a metallic salt such as the salts of cobalt, lead, manganese, chromium and nickel. In the process of that patent, however, the metallic salt, which may be either a soluble or insoluble salt, is added in concentrations greater than 1 part of the salt to 200 parts of the butadiene, or greater than 0.5% based on the material polymerized, and polymerization is effected only after allowing an emulsion containing the butadiene, oxidizing agent and metallic salt to stand for a few days at a temperature of 60° C.

I have now discovered that the presence of exceedingly small amounts of simple water-soluble salts of certain metallic elements, either with or without the simultaneous presence of known initiators and accelerators of polymerization such as oxidizing agents, greatly increases the speed of polymerization of butadiene-1,3 hydrocarbons and enables such polymerizations to be effected in only a few hours and at a temperature of only 20–30° C. Since lower temperatures for polymerization may be employed, products of improved physical properties may be obtained.

Accordingly, this invention is concerned with the use of small concentrations of simple water-soluble salts of metallic elements as catalysts for the aqueous emulsion polymerization of butadiene-1,3 hydrocarbons. The salts employed in this invention are the simple water-soluble salts of the metals occurring in groups II to VI of the Mendeleef Periodic Table including magnesium, calcium, barium, strontium, zinc, cadmium, mercury, aluminum, gallium, cerium, titanium, tin, lead, vanadium, chromium, molybdenum and the like. The salts of those elements occurring in groups II to VI which are capable of existing in more than one valence form such as mercury, cerium, tin, vanadium and chromium are preferred. Another preferred sub-class of salts are those of the group II metals, particularly the group II-B metals.

The term "water-soluble" as applied to these metal salts is used to signify that the salts are appreciably soluble in water, at least to the extent of 0.1 g. in 100 cc. of water at 20° C., while the term "simple" as applied to these salts is meant to denote that the metallic atom present in such a salt exerts one of its normal primary valences as distinguished from "complex compounds" wherein the metallic atom is united to other atoms in the compound by coordinated valences. Typical examples of salts to be used in this invention include the chlorides, nitrates, iodides, bromides, sulfates, sulfites, nitrites, thiocyanates, etc., of any of the metals named above provided they are water soluble. Water-soluble salts of these metals with organic acids such as the acetates, formates, oxalates, tartrates and citrates may also be employed. Either the oxidized or reduced form of those metals capable of existing in more than one valence is effective, for example, both mercurous chloride and mercuric chloride are operable. Mixed salts, acid salts and basic salts which are water soluble as well as water-soluble salts wherein the metal is a part of the anion, sodium zincate for example, may also be used.

The concentration of these salts in the emulsion to be polymerized is a critical part of the invention since the remarkable catalytic effect of these salts on polymerization is exerted only when small concentrations are used. In general the amount of salt should not exceed 0.1% of the quantity of material polymerized nor should it exceed 0.1% of the quantity of water present in the emulsion. Since a larger amount of water than of monomers is normally present when conducting polymerization in aqueous emulsion, the concentration of salt based on the material polymerized is the limiting factor. Preferably, from about 0.001 to 5 parts of the metallic salt for each 10,000 parts of material polymerized, that is, from 0.00001 to 0.05%, should be employed.

As has been mentioned hereinabove, the metal salt catalysts of this invention may be used in the polymerization in aqueous emulsion of any of the butadiene-1,3 hydrocarbons by which is meant butadiene-1,3 itself and its hydrocarbon homologs which polymerize in essentially the same manner such as isoprene, 2,3-dimethyl butadiene-1,3, piperylene, etc., either alone or in admixture with each other and/or in admixture with one or more other unsaturated organic compounds which are copolymerizable therewith in aqueous emulsion. Monomers copolymerizable with butadiene-1,3 hydrocarbons in aqueous emulsion generally are polymerizable compounds containing the structure

where at least two of the disconnected valences are attached to hydrogen and at least one of the disconnected valences is attached to a group more electronegative than alkyl groups. Typical examples of such groups include unsaturated hydrocarbon groups such as vinyl or phenyl, groups containing a

structure such as carboxy and ester groups, cyano groups, halogen, etc. Vinyl and vinylidene compounds particularly are generally copolymerizable with butadiene-1,3 hydrocarbons in aqueous emulsion. Specific monomers copolymerizable with butadiene-1,3 hydrocarbons in aqueous emulsion include styrene, p-chloro styrene, p-methoxy styrene, vinyl naphthalene, acrylonitrile, methacrylonitrile, acrylic acid, methacrylic acid, methyl acrylate, butyl acrylate, methyl methacrylate, ethyl methacrylate, methacrylamide, methyl vinyl ketone, methyl isopropenyl ketone, vinylidene chloride, vinyl furane, diethyl fumarate, chloroprene and the like. It is preferable in this invention, that these copolymerizable monomers, when polymerized in admixture with butadiene-1,3 hydrocarbons, be present in minor proportions by weight since monomer mixtures containing predominant amounts of butadiene-1,3 hydrocarbons yield synthetic rubbers when polymerized. However, the catalysts of this invention may be employed when any mixture of a butadiene-1,3 hydrocarbon with a monomer copolymerizable therewith is copolymerized in aqueous emulsion.

In the practice of the invention the monomer or monomer mixture to be polymerized is emulsified in water with the aid of an emulsifying agent to form an aqueous emulsion. Preferably the water-soluble metal salts of this invention are then added to the emulsion together, if desired, with various other substances, such as polymerization initiators, polymerization accelerators, polymerization modifiers, or even other polymerization catalysts, which may be present during the polymerization. However, it is also possible to add the metal salt to the water prior to emulsification or to form the water-soluble salt in situ. By this latter procedure it is possible, for example, to add metallic zinc to the emulsion rather than a zinc salt if the emulsion is acid or alkaline since the zinc will react with the acid or alkali to give a water-soluble zinc salt.

The emulsion containing the materials to be polymerized and the metal salt catalysts in the proper concentration is then preferably agitated at a temperature of about 20–100° C. until polymerization is substantially complete. This usually requires from 5 to 50 hours at 30° C. or an even shorter time at higher temperatures. The resulting polymerized product is in the form of a latex-like dispersion which may be coagulated in the usual way to yield the solid polymer.

Emulsifying agents which may be used in the above process include partially or completely neutralized fatty acid soaps such as sodium oleate and sodium myristate, hymolal sulfates and sulfonates such as sodium lauryl sulfate and sodium isobutyl naphthalene sulfonate, and other well-known emulsifying agents.

Polymerization initiators which are preferably but not essentially present in the emulsion during the polymerization include oxygen-yielding compounds such as hydrogen peroxide, organic peroxides, potassium persulfate, sodium perborate, sodium periodate, potassium percarbonate, oxygen, ozonides and the like. The catalysts of this invention may also be employed when the polymerization is initiated by other types of initiators such as diazoamino benzene and sulfur dioxide.

Polymerization modifiers such as dialkyl dixanthogens, mercaptans, tetra-alkyl thiuram disulfides and other sulfur-containing organic compounds which enable polymers of increased solubility and plasticity to be prepared may also be present in the emulsion during the polymerization.

It is believed that the function of the metal salts employed in catalyzing polymerization resides in their ability to undergo or to catalyze oxidation-reduction reactions; and that the oxidation reduction reactions occurring activate the monomer molecules to such an extent that they are then capable of adding on to one another in a rapid chain reaction which finally produces the polymer. This same function is also believed to be exerted by many other catalysts containing a heavy metal combined with various other compounds such as pyrophosphates, laevulinic acid, glycine, beta-mercapto ethanol, quebrachitol, cholesterol and the like, which catalysts are more fully disclosed in my copending applications Serial Nos. 379,713 to 379,717 filed February 19, 1941.

As an example of the method of carrying out the invention and in order to illustrate the desirable results obtained by employing the water-soluble salts of metals occurring in groups II to VI of the periodic table as catalysts for the emulsion polymerization of butadiene-1,3 hydrocarbons, an aqueous emulsion containing the following ingredients is prepared:

| | Parts |
|---|---|
| Butadiene-1,3 | 55 |
| Acrylonitrile | 45 |
| Hydrogen peroxide (3½% solution) | 10 |
| Emulsifying solution (2% aqueous solution of myristic acid 85% neutralized with NaOH) | 250 |
| Di-isopropyl dixanthogen disulfide | 0.3 |
| Zinc sulfate | 0.01 |

This emulsion is then agitated at 30° C. for 29 hours whereupon polymerization is complete and a latex-like dispersion is obtained. Upon coagulating the latex a 98% yield of a strong plastic rubbery butadiene-1,3 acrylonitrile copolymer is obtained. When a similar emulsion not containing the zinc sulfate is polymerized under the same conditions, 45 hours are required to produce a 98% yield.

In other embodiments of the invention aqueous emulsions containing butadiene-1,3 and acrylonitrile prepared as indicated above are polymerized at 30° C. in the presence of various salts of metals occurring in groups II to VI of the periodic table. The increase in speed of polymerization brought about by the presence of these salts is shown as follows:

| Metal salt | Concentration of salt (per cent by weight based on monomers) | Per cent yield after 14 hrs. |
|---|---|---|
| None (control) | | 56 |
| Mercuric chloride | 0.01 | 80 |
| Magnesium sulfate | 0.01 | 67 |
| Calcium chloride | 0.01 | 65 |
| Strontium chloride | 0.01 | 65 |
| Aluminum sulfate | 0.01 | 67 |
| Ceric sulfate | 0.01 | 76 |

It is seen that in all cases the presence of the metal salt increased the polymerization rate. Whereas the emulsions containing the metal salt were completely polymerized in 38 hours or less time, the emulsion not containing the metal salt required 45 hours for completion.

In still another embodiment of the invention an emulsion containing the following ingredients is polymerized at 30° C.

| | Parts |
|---|---|
| Butadiene-1,3 | 70 |
| Styrene | 30 |
| Water | 250 |
| Fatty acid soap | 5 |
| Hydrogen peroxide | 0.35 |
| Polymerization modifier | 0.45 |
| Mercuric chloride | 0.02 |

The polymerization requires 43 hours to produce a 96% yield of a plastic synthetic rubber. In the absence of the mercuric chloride the polymerization requires over 150 hours.

It will be obvious to those skilled in the art that many modifications in the nature and proportions of materials polymerized, in the nature of the metallic salt and in the nature and proportion of the other substances present in the emulsion may be made in the above specific examples, in accordance with the broad disclosure herein, without departing from the spirit and scope of the invention as defined by the appended claims.

I claim:

1. The method which comprises preparing an aqueous emulsion containing water and a lesser amount of polymerizable material comprising a butadiene-1,3 hydrocarbon, adding to the water of said emulsion from about 0.00001 to 0.05% by weight based on the total polymerizable material present of a simple ionizable salt of a metal occurring in group II–B of the periodic table, the said salt being one which is capable of dissolving in water at least to the extent of 0.1 g. in 100 cc. of water at 20° C., and polymerizing the butadiene-1,3 hydrocarbon in the aqueous emulsion in the presence of the added salt, whereby the rate of polymerization is substantially increased.

2. The method of claim 1 wherein the metal salt is a salt of mercury.

3. The method of claim 1 wherein the metal salt is a salt of zinc.

4. The method which comprises preparing an aqueous emulsion containing water and a lesser amount of a monomeric mixture of butadiene-1,3 and another unsaturated compound copolymerizable therewith in aqueous emulsion, adding to the water of said emulsion from about 0.00001 to 0.05% by weight based on the monomeric mixture of a simple ionizable salt of a metal occurring in Group II–B of the periodic table, the said salt being one which is capable of dissolving in water at least to the extent of 0.1 g. in 100 cc. of water at 20° C., and polymerizing the said monomeric mixture in the aqueous emulsion in the presence of the added salt, whereby the rate of polymerization is substantially increased.

5. The method of claim 4 further characterized in that the polymerization of the monomeric mixture in aqueous emulsion is effected in the presence of an oxygen-yielding initiator of polymerization.

6. The method of claim 4 wherein the monomeric mixture is a mixture of butadiene-1,3 and acrylonitrile.

7. The method which comprises preparing an aqueous emulsion containing water and a lesser amount of a monomeric mixture of butadiene-1,3 and another unsaturated compound copolymerizable therewith in aqueous emulsion, adding to the water of said emulsion about 0.01% by weight based on the monomeric mixture of a simple ionizable salt of a metal occurring in group II–B of the periodic table, the said salt being one which is capable of dissolving in water at least to the extent of 0.1 g. in 100 cc. of water at 20° C., and polymerizing the said monomeric mixture in the aqueous emulsion in the presence of the added salt, whereby the rate of polymerization is substantially increased.

8. The method of claim 7 wherein the monomeric mixture is a mixture of butadiene-1,3 and acrylonitrile.

9. The method which comprises preparing an aqueous emulsion containing about 250 parts of water and about 100 parts of a monomeric mixture of about 55 parts of butadiene-1,3 and about 45 parts of acrylonitrile, adding to the water of said emulsion about 0.01 part of mercuric chloride, and polymerizing the monomeric mixture in the aqueous emulsion in the presence of the mercuric chloride, whereby the rate of polymerization is substantially increased.

10. The method of claim 9 further characterized in that the polymerization of the monomeric mixture in aqueous emulsion is effected in the presence of hydrogen peroxide.

WILLIAM D. STEWART.

REFERENCES CITED

The following references are of record in the file of this patent:

UNITED STATES PATENTS

| Number | Name | Date |
|---|---|---|
| 2,118,863 | Reppe | May 31, 1938 |
| 2,296,403 | Renfrew | Sept. 22, 1942 |
| 2,317,858 | Soday | Apr. 27, 1943 |
| 1,935,733 | Tschunkur | Nov. 21, 1933 |
| 1,953,169 | Gibbons et al. | Apr. 3, 1934 |
| 2,377,752 | Britton et al. | June 5, 1945 |

FOREIGN PATENTS

| Number | Country | Date |
|---|---|---|
| 511,145 | German | Oct. 27, 1930 |

OTHER REFERENCES

Pages 744–747, "Lange's Handbook of Chemistry," pub. 1944, by Handbook Publishers Inc., Sandusky, Ohio.